United States Patent [19]

Adamis et al.

[11] Patent Number: 4,834,048
[45] Date of Patent: May 30, 1989

[54] INTERNAL COMBUSTION ENGINE HAVING AT LEAST TWO INLET VALVES PER COMBUSTION CHAMBER

[75] Inventors: Panagiotis Adamis, Wolfsburg; Alfred Beier, Braunschweig, both of Fed. Rep. of Germany

[73] Assignee: Volkswagen AG, Wolfsburg, Fed. Rep. of Germany

[21] Appl. No.: 197,441

[22] Filed: May 20, 1988

[30] Foreign Application Priority Data

May 20, 1987 [DE] Fed. Rep. of Germany ....... 3716818

[51] Int. Cl.4 ............................................ F02B 15/00
[52] U.S. Cl. .................. 123/432; 123/52 M; 123/188 M
[58] Field of Search ............... 123/52 M, 188 M, 432, 123/308

[56] References Cited

U.S. PATENT DOCUMENTS 4,703,734 11/1987 Aoyama et al. ...................... 123/432
4,727,719 3/1988 Mitzutani ............................. 123/432

FOREIGN PATENT DOCUMENTS 90720 5/1984 Japan ................................... 123/432
2087975 6/1982 United Kingdom ................ 123/432

Primary Examiner—E. Rollins Cross
Attorney, Agent, or Firm—Brumbaugh, Graves, Donohue & Raymond

[57] ABSTRACT

In the embodiment of the invention described in the specification, two inlet valves associated with a cylinder of an internal combustion engine are supplied through two separate inlet lines. One of the inlet valves is supplied with air and fuel at all engine speeds, and the other inlet valve is supplied with supplementary air at higher engine speeds only. The valve opening curves are so chosen that gas return flows are avoided in the case of the gas and air inlet valve, and a scavenging effect is achieved by maintaining the supplementary air inlet valve open for a longer time.

8 Claims, 1 Drawing Sheet

INTERNAL COMBUSTION ENGINE HAVING AT LEAST TWO INLET VALVES PER COMBUSTION CHAMBER

BACKGROUND OF THE INVENTION

This invention relates to internal combustion engines having two inlet valves for each combustion chamber and, more particularly, to a new and improved engine of that type.

Internal combustion engines having two inlet valves are described, for example, in German Offenlegungsschrift No. 2,815,701, wherein a second inlet line is activated for the supply of supplementary air to the combustion chamber only in a high rotational speed range of the engine. Such dual intake valve arrangements provide the fundamental advantage of torque optimization in both low and high ranges of engine speed. As mentioned in that disclosure, this is especially true when the first inlet line, which is open at all speeds, has a smaller flow cross-section than the second inlet line, which provides a supply of air at higher rotational speeds only An internal combustion engine of similar design is disclosed in German Offenlegungsschrift No. 3,502,699. That engine has two separate inlet lines opening into a common entrance area for two inlet valves and one of the inlet lines is opened by a throttle flap in the higher engine speed range only. That internal combustion engine, in which both inlet lines are supplied with fuel by injection, includes an arrangement for varying the lengths of the two inlet lines as functions of engine speed and for displacing the valve opening curve of the second inlet valve as a function of the speed. By this adaptation of the operation time of the second inlet valve, an optimum utilization of the intake lag effect can be achieved. Such speed-dependent displacement of the valve opening curve, without change in shape and magnitude, with increasing delay for increased speed, however, is complicated and expensive. First, it requires a large engineering outlay to provide the necessary regulation and/or control and, secondly, since the valve opening curve, i.e., the valve stroke as a function of time or crank angle, remains unchanged, it does not produce optimum conditions for filling the combustion chamber in the higher engine speed range.

SUMMARY OF THE INVENTION

An object of the invention is to provide an internal combustion engine having two inlet valves which overcomes the above-mentioned disadvantages of the prior art.

Another object of the invention is to provide an internal combustion engine of the above type providing optimized filling of the combustion chamber without loss of torque due to return gas flow in the low-speed range.

These and other objects are attained according to the invention by providing an internal combustion engine with a combustion chamber having two inlet valves with different valve opening curves which are independent of engine speed and including an arrangement for closing one of the valves supplying fuel to the chamber at a time which essentially prevents return flow at low speeds and for opening the second valve, which supplies supplementary air, no later than the first valve and closing the second valve later than the first valve to provide scavenging.

In one embodiment, the inlet to the second valve is kept closed when the engine is not operating at high speed by a flap valve which opens only at higher engine speeds. In addition, opening of the flap valve may be retarded by a control device responsive to engine speed. Also, the inlet lines to the valves may have differing lengths or cross-sections to improve engine output.

According to the invention, the large engineering outlay required for the arrangement described in German Offenlegungsschrift No. 3,502,699 for control of the valve opening curve of the second inlet valve as a function of speed is avoided since both inlet valves have opening times which are independent of engine speed. Hence, conventional constant cams may be employed to actuate both valves, but they should have different configurations since the two inlet valves must have different times or angles of opening. The opening time of the inlet valve which provides a constant intake, i.e., is open at all engine speeds, must be comparatively short. In other words, for a reciprocating piston engine, the intake through that valve must end comparatively shortly after the bottom-dead-center crank angle, so that undesirable return currents that would otherwise occur because of the comparatively low kinetic energy of the volume of gas flowing in at the low speeds will be avoided.

By contrast, the configuration of the valve control curve of the second inlet valve, which will not allow supplementary air to enter the combustion chamber unless the engine is operating at higher speed, is subject to the requirement for achieving an effective fill, since at these higher engine speeds the air flowing into the chamber has such a high kinetic energy that return flow is practically ruled out. To achieve an effective fill at higher speeds, it is therefore expedient that the opening cross-section of the second inlet valve, that is, the area under the opening curve of the valve, should be as large as possible. In other words, the opening time of this valve should be as long as possible (or its opening crank angle as large as possible).

Conveniently, therefore, the second inlet valve will not only open earlier than the first inlet valve, but will also close considerably later, that is, appreciably after the bottom dead-center crank angle. This provides the advantage of an enlarged opening cross-section at high rotational speeds in comparison with the engine of German Offenlegungsschrift No. 3,502,699.

BRIEF DESCRIPTION OF THE DRAWINGS

Further objects and advantages of the invention will be apparent from a reading of the following description in conjunction with the accompanying drawings, in which.

DESCRIPTION OF PREFERRED EMBODIMENTS

Figure 1:
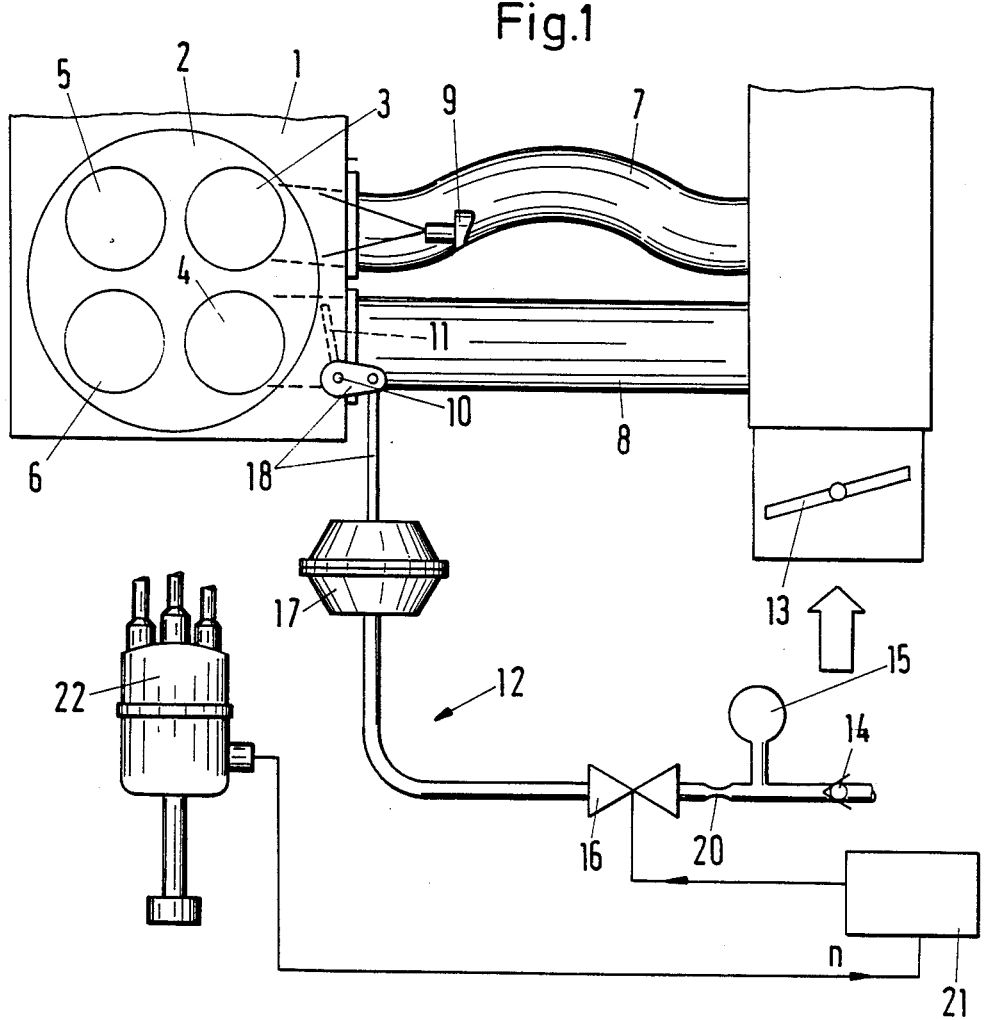
FIG. 1 is a schematic top view, partially in section, illustrating a representative reciprocating piston engine arranged according to the invention.

Referring first to the typical example of the invention shown in FIG. 1, the cylinder block 1 of an internal combustion engine has a cylinder 2 with which two inlet valves 3 and 4 and two outlet valves 5 and 6 communicate. Each of the two inlet valves 3 and 4 are of a conventional type and hence are not shown in detail, and they are likewise actuated in a conventional manner by way of a camshaft (not shown) driven by the engine. The inlet valves 3 and 4 have corresponding individual intake lines 7 and 8, respectively. In the intake line 7 there is a fuel injection valve 9 spaced at a sufficient distance from the inlet valve 3 that a good mixing of fuel and air takes place in the inlet line 7 between valves 3 and 9. The other inlet line 8 contains no fuel injection nozzle and thus serves only to supply supplementary combustion air to the cylinder 2. A hinged flap 11, mounted on a pivot 10 in the region of one wall of the line 8, is swung out of its closed position, shown in dotted outline in FIG. 1, by a control system, designated generally by the numeral 12, into its open position only when the rotational speed of the engine is in a higher range.

It should be mentioned here that, instead of the swinging flap 11 in series with the second inlet valve 4, which is actuated by way of the camshaft at all speeds, an inlet valve may be employed which is deactivated at low rotational speeds. In other words, the inlet valve 4 may be kept closed at low speeds, thereby preventing the intake of supplementary air into the cylinder 2 by way of the other inlet line 8.

The flap 11 in the illustrated embodiment shown by way of example in FIG. 1 is arranged immediately ahead of the second inlet valve 4, so that no space is provided between the flap and the second inlet valve to permit any return flow at low engine speeds.

As previously mentioned, the first inlet line 7 serves to supply combustion air and, by way of the injection nozzle 9, fuel to the cylinder 2 at all engine speeds, while the second inlet line 8, as controlled by the flap 11, admits additional combustion air to the cylinder 2 only when the engine is operating in a higher speed range. Moreover, the total air throughput is regulated or controlled by a conventional throttle 13, which is actuated from a gas pedal (not shown) controlled by the driver of the vehicle equipped with the engine. To achieve an oscillatory, or build-up, effect, the first inlet line 7 is curved so as to be comparatively long and has a relatively small flow cross-section, while the second inlet line 8 is relatively short, straight, and has a larger cross-section.

The control system 12 for the flap 11 includes a negative pressure reservoir 15 connected through a check valve 14 to a negative pressure source (not shown), for example, an aspirator in the inlet line. A three-way valve 16 connects a negative pressure chamber 17 selectively to the negative pressure reservoir 15 or to atmospheric pressure, and the chamber 1 directly controls the swinging motion of the flap 11 through a linkage 18. A throttle 20 is located between the check valve 14 and the negative pressure reservoir 15 on the one hand, and the negative pressure input to the three-way valve 16 on the other hand. The throttle 20, by virtue of its special location, merely retards the negative pressure build-up in the negative pressure chamber 17, and hence the opening motion of the flap 11, so as to prevent a rapid collapse of the torque developed by the engine in the manner of an abrupt load alteration.

The three-way valve 16 is controlled by a switch 21, which is actuated in turn by rotational speed signals n from a distributor 22 of the engine.

Figure 2:
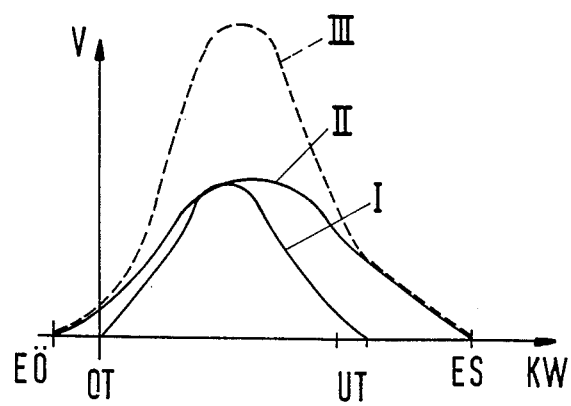
FIG. 2 is a graphical representation illustrating typical valve control curve for the two inlet valves of the engine of FIG. 1 plotted against the crank angle.

In the graphical illustration of FIG. 2, I represents the opening curve (that is, the stroke) of the first inlet valve 3, II represents the corresponding curve of the second inlet valve 4, and III illustrates the resultant inflow cross-section, which is the sum of the two curves I and II, plotted against the crank angle KW. The valve stroke is the vertical coordinate V, the top-dead-center is at OT, the bottom-dead-center at UT, the point of inlet opening of the valve system comprising the two valves 3 and 4 is at EO, and the corresponding point of closure is at ES.

In the embodiment shown by way of example, the opening of the first valve 3 according to the curve I begins at OT, and the valve 3 closes comparatively soon after UT. This opening action is executed by the inlet valve 3, as has been mentioned several times, at all engine speeds, including a lower speed range in which the other inlet valve 4, owing to closure of the flap 11, does not supply any combustion air to the cylinder 2. At these relatively low speeds, the intake flow still has comparatively low kinetic energy so that, upon reversal of motion of the piston in the cylinder 2, which is to say practically at UT, the danger of return flow of intake into the first inlet line 7 arises. For this reason, the first inlet valve 3 closes quite soon after UT.

Only at higher speeds will the flap 11 be opened to connect the other inlet line 8, and hence the other inlet valve 4, to supply supplementary combustion air to the cylinder 2. At these higher engine speeds, the fresh gas supplied to the cylinder 2 has a sufficiently high kinetic energy to eliminate the danger of reverse intake flow. In the selection of the valve control curves I and II, effective filling of the cylinder 2 while maintaining a scavenging effect is the prime consideration. Consequently, the curve II for the second inlet valve 4 starts ahead of TO but ends considerably after UT. Hence the area under the curve II, governing the resultant flow cross-section per cycle, is substantially larger than the corresponding area under the curve I, so that at high speeds the sum of the areas, i.e., the area under the combined curve III, is considerably more than double the area under the curve I. AT high speeds, then, the valve control system according to the invention achieves an optimum fill of the cylinder 2 while avoiding disadvantages in operation at low rotational speeds.

Thus, the present invention provides an internal combustion engine having at least two individual inlet valves arranged to optimize the development of engine torque in operation at various speed levels, with low engineering cost outlays.

Although the invention has been described herein with reference to specific embodiments, many modifications and variations therein will readily occur to those skilled in the art. Accordingly, all such variations and modifications are included within the intended scope of the invention.

We claim:

1. An internal combustion engine comprising a combustion chamber, at least two inlet valves for the combustion chamber, first and second inlet lines associated with the two inlet valves respectively, the first inlet line having fuel injector means supplying the entire fuel requirement of the combustion chamber and operating over the entire speed range of the engine, the second inlet line supplying supplementary air to the combustion chamber only in a high engine speed range, the two inlet valves having different opening curves which are independent of engine speed, the inlet valve associated with the second inlet line opening at least as early as the inlet valve associated with the first inlet line and the inlet valve associated with the first inlet line having a closing time early enough to essentially prevent return gas flow at low engine speeds, while the inlet valve associated with the second inlet line closes later than the inlet valve associated with the first inlet line in order to achieve a scavenging effect.

2. An internal combustion engine according to claim 1 wherein the inlet valve associated with the second inlet line is kept closed at speeds below a selected engine speed.

3. An internal combustion engine according to claim 1 including a flap positioned in the second inlet line immediately ahead of the inlet valve associated therewith, and control means for moving the flap into an open position at speeds above a selected engine speed.

4. An internal combustion engine according to claim 3 wherein the control means comprises retarding means for retarding the opening of the flap.

5. An internal combustion engine according to claim 4 wherein the control means is responsive to negative pressure and including a negative pressure source and a negative pressure control valve, and throttle means disposed between the negative pressure control valve and the negative pressure source.

6. An internal combustion engine according to any one of claims 3, 4 and 5 wherein the engine includes a cylinder head and the flap is arranged in the cylinder head of the engine.

7. An internal combustion engine according to any one of claims 1 to 5 wherein the first and second inlet lines have different lengths in order to provide torque-enhancing gas oscillations.

8. An internal combustion engine according to any one of claims 1 to 5 wherein the first and second inlet lines have different flow cross-sections in order to provide torque-enhancing gas oscillations.

* * * * *